United States Patent
Edel et al.

(10) Patent No.: US 9,944,875 B2
(45) Date of Patent: Apr. 17, 2018

(54) LIGNITE DRYING IN A LIGNITE FIRED POWER PLANT WITH A HEAT PUMP

(71) Applicant: ALSTOM Technology Ltd, Baden (CH)

(72) Inventors: Thomas Edel, Colmar (FR); Frederic Geiger, Giromagny (FR); Thierry Pourchot, Naves Parmclan (FR); Didier Wantz, Bavilliers (FR)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 140 days.

(21) Appl. No.: 15/163,159

(22) Filed: May 24, 2016

(65) Prior Publication Data

US 2016/0348020 A1    Dec. 1, 2016

(30) Foreign Application Priority Data

May 26, 2015 (EP) ..................... 15290141

(51) Int. Cl.
*F01K 7/16* (2006.01)
*C10L 5/04* (2006.01)
(Continued)

(52) U.S. Cl.
CPC .................... *C10L 5/04* (2013.01);
*F01K 7/16* (2013.01); *F01K 7/44* (2013.01);
*F01K 11/02* (2013.01);
(Continued)

(58) Field of Classification Search
CPC .... C10L 5/04; C10L 2290/08; C10L 2290/06; F26B 23/005; F26B 23/008; F01K 7/16;
(Continued)

(56) References Cited

U.S. PATENT DOCUMENTS 4,291,539 A    9/1981 Potter
4,601,113 A    7/1986 Draper et al.
(Continued)

FOREIGN PATENT DOCUMENTS

AU    1404783 A    8/1983
CN    101881191 A    11/2010
(Continued)

OTHER PUBLICATIONS

Rupprecht, T., and Fielenbach, C., "Efficiency and Flexibility—Techno-Economical Challenges for Pre-Dried Lignite Fired Power Plants," POWER-GEN Europe, Milan, Italy, pp. 1-19 (Jun. 7-9, 2011).

(Continued)

*Primary Examiner* — Hoang Nguyen

(57) ABSTRACT

The invention relates to a lignite fired steam power plant comprising a water/steam power cycle and a lignite dryer system having a heat pump circuit configured and arranged to provide heat energy to a lignite dryer of the dryer system. The heat pump includes a dryer heat exchanger, an expansion device and an evaporator heat exchanger connected to the first outlet line so as to enable heat energy transfer from the vapour of the first outlet line to the first working fluid. A compressor is also included in the heat pump circuit. In addition the heat pump circuit is connected to the water/steam power cycle by a steam makeup line from the pressure series of steam turbines and a condensate return line.

14 Claims, 2 Drawing Sheets

(51) Int. Cl.

| | | |
|---|---|---|
| *F26B 23/00* | (2006.01) | |
| *F01K 7/44* | (2006.01) | |
| *F01K 17/06* | (2006.01) | |
| *F23K 1/04* | (2006.01) | |
| *F01K 11/02* | (2006.01) | |

(52) U.S. Cl.
CPC .............. *F01K 17/06* (2013.01); *F23K 1/04* (2013.01); *F26B 23/005* (2013.01); *F26B 23/008* (2013.01); *C10L 2290/06* (2013.01); *C10L 2290/08* (2013.01); *F23K 2201/20* (2013.01)

(58) Field of Classification Search
CPC . F01K 11/02; F01K 7/44; F01K 17/06; F23K 1/04; F23K 2201/20
USPC .................................. 60/653, 654, 677–680
See application file for complete search history.

(56) References Cited

U.S. PATENT DOCUMENTS

| | | |
|---|---|---|
| 4,601,115 A | 7/1986 | Draper et al. |
| 5,175,993 A * | 1/1993 | Raiko .................... F01K 17/06 60/39.182 |
| 5,353,517 A | 10/1994 | Weiss |
| 6,148,599 A | 11/2000 | McIntosh et al. |
| 8,661,821 B2 | 3/2014 | Zhao et al. |
| 2006/0107587 A1* | 5/2006 | Bullinger ................. C10L 9/08 44/629 |
| 2006/0113221 A1* | 6/2006 | Ness ........................ B03B 4/06 209/476 |
| 2006/0199134 A1* | 9/2006 | Ness ........................ B03B 4/06 432/121 |
| 2008/0201980 A1* | 8/2008 | Bullinger ................. B03B 4/06 34/493 |
| 2010/0212320 A1 | 8/2010 | Block et al. |
| 2011/0061298 A1* | 3/2011 | Frey .......................... C10J 3/72 48/78 |
| 2011/0214427 A1 | 9/2011 | Zhao et al. |
| 2011/0220744 A1* | 9/2011 | Zhao ......................... F01K 7/22 241/18 |
| 2012/0055158 A1 | 3/2012 | Berger et al. |

FOREIGN PATENT DOCUMENTS

| | | |
|---|---|---|
| CN | 201697441 U | 1/2011 |
| CN | 102353237 A | 2/2012 |
| CN | 103453752 A | 12/2013 |
| CN | 102759259 B | 6/2014 |
| CN | 102758657 B | 12/2014 |
| CN | 204041130 U | 12/2014 |
| DE | 41 15 781 C2 | 9/1994 |
| DE | 19518644 A1 | 11/1996 |
| DE | 196 12 186 A1 | 10/1997 |
| DE | 195 12 015 C2 | 7/1998 |
| DE | 196 01 931 C2 | 9/2000 |
| DE | 103 19 477 A1 | 11/2004 |
| DE | 10 2007 023 336 A1 | 11/2008 |
| DE | 10 2009 019 334 A1 | 11/2010 |
| DE | 102009035062 A1 | 2/2011 |
| EP | 0 576 053 B1 | 1/1996 |
| EP | 2 412 943 A2 | 2/2012 |
| EP | 2 423 465 A2 | 2/2012 |
| EP | 2 436 978 A1 | 4/2012 |
| EP | 2 873 934 A1 | 5/2015 |
| FR | 485639 A | 1/1918 |
| FR | 2 984 400 A1 | 6/2013 |
| JP | H06146812 A | 5/1994 |
| WO | 2011/033559 A1 | 3/2011 |
| WO | 2012/005164 A1 | 1/2012 |

OTHER PUBLICATIONS

Extended European Search Report and Opinion issued in connection with related EP Application No. 15290138.5 dated Aug. 13, 2015.
Extended European Search Report and Opinion issued in connection with related EP Application No. 15290139.3 dated Nov. 18, 2015.
Extended European Search Report and Opinion issued in connection with related EP Application No. 15290140.1 dated Nov. 24, 2015.
Extended European Search Report and Opinion issued in connection with related EP Application No. 16169541.6 dated Jun. 21, 2016.
Extended European Search Report and Opinion issued in connection with related EP Application No. 6169514.3 dated Oct. 5, 2016.
Edel et al., May 24, 2016, U.S. Appl. No. 15/162,904.
Edel et al., May 17, 2016, U.S. Appl. No. 15/156,632.
Edel et al., May 24, 2016, U.S. Appl. No. 15/162,987.

* cited by examiner

LIGNITE DRYING IN A LIGNITE FIRED POWER PLANT WITH A HEAT PUMP

CROSS-REFERENCE TO RELATED APPLICATIONS

This application claims priority to European Patent Application No. 15290141.9 filed May 26, 2015, the contents of which are hereby incorporated in its entirety.

TECHNICAL FIELD

The present disclosure relates generally to the thermal Integration of a lignite drying process within a lignite fired power plant with or without $CO_2$ capture, and more specifically to the recovery and reuse of thermal energy in the lignite fired power plant.

BACKGROUND

The general principle of lignite drying in a lignite fired plant is well known and involves using either hot flue gas extraction and/or steam extraction from the water/steam cycle to supply thermal energy to the lignite drying systems comprising beater mills, rotary drum dryer or fluidized bed dryers.

So called beater mills technology uses hot flue gas extracted from the top of the furnace and then recirculates this extraction in the mill in order to evaporate the high amount of lignite moisture, which can be up to 60% of lignite content for "B" grade lignites. Drying is an important step as it enables pulverization of lignite necessary for combustion. A problem of such systems is that it results in a very high efficiency penalty due to the need for very high enthalpy heat from the boiler for the drying process. The high heat requirement results in high boiler losses due to the loss of residual sensible heat from the large flue gas flow and zero recovery of the latent heat of removed moisture from the lignite.

To at least mitigate this problem lignite pre-drying techniques have been developed using medium or low enthalpy heat to achieve partial or high level of lignite pre-drying before pulverization. The techniques can provide efficiency gains of up to 3% points without heat recovery of evaporation vapour of lignite moisture or 5% point with heat recovery of evaporation vapour of lignite moisture.

German patent DE 195 18 644 C2 provides a solution utilising so called Waste Heat Utilisation (WTA) type 1 and 2 processes in order to pre-drying lignite.

The WTA type I process includes a direct heat pump loop with a vapour compressor that utilises the moisture vapour as drying heat. After de-dusting to remove lignite particles, the vapour is compressed with a vapour-compressor and sent in the heat exchanger of the dryer. Remaining heat of the drying vapour condensates exiting the dryer heat exchanger can be integrated in the low pressure condensate heaters of a water steam cycle of a typical steam power plant. The process does not require any steam extraction from the water/steam cycle and may be operated independently from the power plant. While it maximizes recycle of the drying vapour heat to evaporate the lignite moisture the process can have the disadvantage that as "dirty" drying vapour is used for compression, the required compressor may be large and expensive and further may be fouled and/or eroded and/or corroded if no advanced cleaning of dirty vapour is carried out.

The alternate WTA type 2 process includes a steam extraction from water/steam cycle of a typical steam power plant for the drying heat source. This process is much simpler and cheaper than WTA type 1, however, optimisation of the location of steam extraction varies with plant load and as such may lead to lower net plant efficiency that the type 1 system if no or limited heat recovery from drying vapour occurs. A further problem can be that the maximization of the heat recovery from drying vapours for plant performance improvement, together with the cleaning of this vapour, for environmental reasons, may require cleaning of the dirty vapour by condensation in order to avoid release of pollutants which would otherwise occur if released directly in the atmosphere in the vapour state.

SUMMARY

A lignite fired power plant with a lignite dryer having a heat pump circuit and further heat integration that provide improved thermal efficiency or at least a useful alternative.

It attempts to address this problem by means of the subject matters of the independent claims. Advantageous embodiments are given in the dependent claim.

One general aspect includes a lignite fired steam power plant comprising: a water/steam power cycle, a dryer system for drying lignite coal having a heat pump circuit. The water/steam power cycle having a pressure series of steam turbines, a condenser at a low pressure end of pressure series of steam turbines configured and arranged to condense steam exhausted from the low pressure end of the pressure series of steam turbines, and a low pressure condensate system, arranged downstream of the condenser and adapted to preheat condensate from the condenser. The dryer system has a dryer, a vapour outlet line for removing a vapour from the dryer and the heat pump circuit. The heat pump circuit, configured and arranged to provide heat energy to the dryer, comprises a first working fluid, a dryer heat exchanger located in the dryer, an expansion device fluidly connected and downstream of the heat exchanger, an evaporator heat exchanger fluidly connected to and downstream of the expansion device and further connected to the vapour outlet line so as to enable heat energy transfer from the vapour of the vapour outlet line to the first working fluid, a compressor for compressing the first working fluid and fluidly connected to and downstream of the evaporator heat exchanger and upstream of the dryer heat exchanger, a steam makeup line that extends from the pressure series of steam turbine to a point fluidly between the dryer and the compressor, and a condensate return line extending from a point fluidly between the dryer heat exchanger and the expansion device to the low pressure condensate system so as to return condensate into the water steam power cycle.

Further aspects may include one or more of the following features. The dryer is a fluidised bed dryer or a steam heated rotary tube dryer. The expansion device is a valve or turbine. The low pressure condensate system further includes a first condensate preheater and the vapour outlet line, located downstream of the evaporator heat exchanger, extends through the first condensate preheater so as to enable transfer of heat energy from the vapour of the dryer to a condensate of the water steam cycle. The low pressure condensate system further includes a first condensate preheater, and a branch in the vapour outlet line, upstream of the evaporator heat exchanger, extends through the first condensate preheater so as to enable transfer of heat energy from the vapour of the dryer to a condensate of the water steam cycle. A combustion air heat exchanger, thermally connected to the vapour outlet line downstream of the evaporator heat exchanger, for heating a combustion air for use in the lignite fired steam power plant. An intermediate water loop comprising a second working fluid, an intermediate heat exchanger fluidly connected to the vapour outlet line either upstream, downstream, or parallel to the evaporator heat exchanger, and the combustion air heat exchanger wherein the intermediate water loop is adapted to receive a thermal energy from vapour of the dryer in the intermediate heat exchanger from the vapour outlet line and transfer the received thermal energy to the water working fluid where it is transferred to the combustion air by means of the combustion air heat exchanger. The combustion air heat exchanger is fluidly connected to the vapour outlet line.

Other aspects and advantages of the present disclosure will become apparent from the following description, taken in connection with the accompanying drawings which by way of example illustrate exemplary embodiments of the present invention.

BRIEF DESCRIPTION OF THE DRAWINGS

By way of example, an embodiment of the present disclosure is described more fully hereinafter with reference to the accompanying drawings, in which.

DETAILED DESCRIPTION

Figure 1:
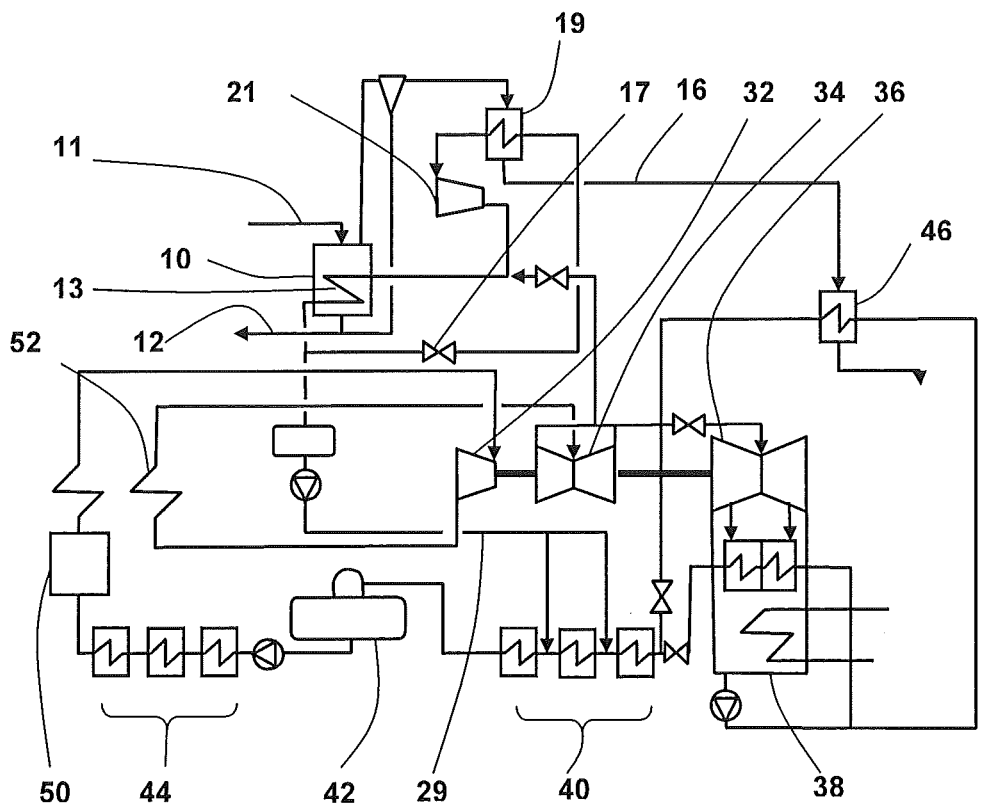
FIG. 1 is a schematic of a lignite fired power plant with a lignite dryer heated by a heat pump circuit with thermal integration into the condensate system of the power plant according to an exemplary embodiment.

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiment disclosed herein.

FIG. 1 shows an exemplary embodiment of a lignite fired steam power plant for drying pulverised lignite utilising an indirect heat pump process. In its simplest form the system comprises a drying system and a heat pump circuit connected to a water/steam power cycle for heating the dryer 10.

The drying system includes an inlet line 11 to direct lignite into the dryer 10, a vapour outlet line 16 for exhausting moisture laden gas from the dryer 10 and a solids outlet line 12 for discharging dried lignite for use in a combustor. The dryer 10 can be a steam fluidized bed dryer or a steam heated rotary tube dryer.

In an exemplary embodiment drying vapour produced in the dryer is de-dusted in a particle removal system, such as a cyclone, electrostatic precipitator, fabric filter or any combination of a cyclone, electrostatic precipitator, fabric filter cycle, when lignite particles removed from the particle removal system are returned to the dryer 10 or the solids outlet line 12.

The heat pump circuit comprises a working fluid that circulates between a dryer heat exchanger 13 located in the dryer 10, an expansion device 17, an evaporator heat exchanger 19 and a compressor 21.

In an exemplary embodiment applicable to an atmospheric or low pressure dryer, the heat pump circuit provides 3-4 bar(a) low pressure low superheat steam to the dryer heat exchanger 13 to heat and dry wet lignite in the dryer 10. Steam is condensed within the dryer 10 in the dryer heat exchanger 13 causing evaporation of wet lignite moisture, thus producing the drying vapour that is exhausted from the dryer by a vapour outlet line 16.

Low pressure condensate in the heat pump circuit exits the dryer heat exchanger 13 and is expanded to very low pressure, for example 0.5 bara, by an expansion device 17 resulting in partial evaporation of the condensate. In one exemplary embodiment the expansion device 17 is a throttling valve. In another exemplary embodiment the expansion device 17 is a turbine.

The expanded working fluid is then evaporated in an evaporator heat exchanger 19 against dryer vapour in the vapour outlet line 16 wherein the evaporating of the working fluid may result in the at least partial condensation of the dryer vapour. Working fluid vapour is then further compressed in a compressor 21 and then returned to the dryer heat exchanger 13.

The heat pump circuit is further connected to a water/steam power cycle comprising a pressure series of steam turbines comprising at least a high pressure steam turbine 32, an intermediate pressure steam turbine 34, and a low pressure steam turbine 36. A condenser 38, located at a low pressure end of pressure series of steam turbines is configured and arranged to condense steam exhausted from the low pressure steam turbine 36. A low pressure condensate system 40, adapted to preheat condensate from the condenser, is arranged downstream of the condenser 38 while a high pressure condensate system 44, fluidly separated from the low pressure condensate system 40 by a feedwater tank 42, is adapted to further preheat condensate from the feedwater tank 42. High pressure condensate from the high pressure condensate system 44 is then fed to a lignite fired boiler 50 where steam is generating and further fed to the to the high pressure steam turbine 32. Thermal energy from the boiler may further be utilised in a reheater 52 to reheat steam between the high pressure steam turbine 32 and the intermediate pressure steam turbine 34.

In an exemplary embodiment shown in FIG. 1, at a first point fluidly between the dryer heat exchanger 13 and the expansion device 17 the heat pump circuit is connected to the low pressure condensate system by a condensate return line 29. This connection defines a return point of condensate from the heat pump circuit to the water/steam power cycle.

In an exemplary embodiment shown in FIG. 1 the heat pump circuit is further connected at a second point fluidly between the compressor 21 and the dryer heat exchanger to the pressure series of steam turbines via a steam makeup line 27. In an exemplary embodiment this is at a point of the water/steam power cycler where the steam pressure is between 4-6 Bara.

The connection to the water/steam power cycle reduces the energy recovered in evaporator heat exchanger 19 and the size of the compressor 21 that would otherwise be needed should the heat pump circuit not comprise this water/steam power cycle connection. This enables additional heat integration in other parts of the power plant.

In an exemplary embodiment shown in FIG. 1 the additional integration comprises a first condensate preheater 46 on the vapour outlet line 16 downstream of the evaporator heat exchanger 19. In a not shown exemplary embodiment the first condensate preheater 46 on the vapour outlet line 16 is located upstream of the evaporator heat exchanger 19.

Figure 2:
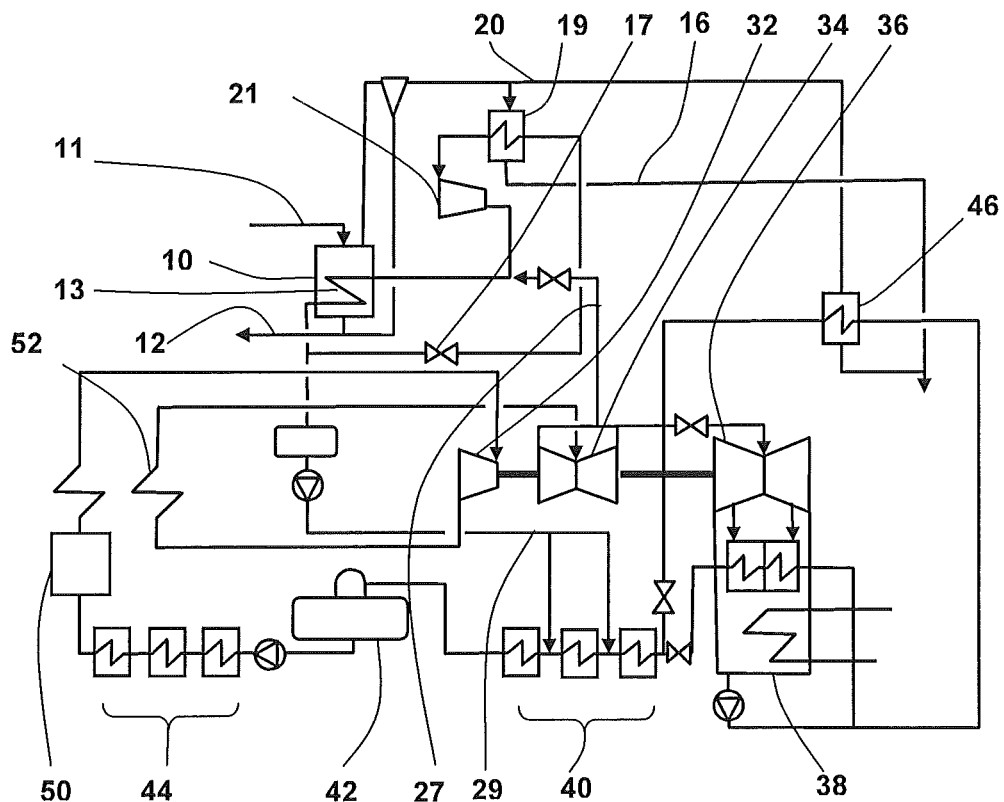
FIG. 2 is a schematic of an exemplary embodiment showing the heat pump circuit of FIG. 1 and an alternate condensate system thermal integration.

In an exemplary embodiment shown in FIG. 2 the additional integration comprises a first condensate preheater 46 on a branch 20 of the vapour outlet line 16 that branches from the vapour outlet line 16 upstream of the evaporator heat exchanger 19. In a not shown exemplary embodiment the branch 20 of the vapour outlet line 16 branches from the vapour outlet line 16 downstream of the evaporator heat exchanger 19. In a further not shown exemplary embodiment, the branch 20 is combined with the evaporator heat exchanger 19 such that the first condensate preheater 46 is combined with the evaporator heat exchanger 19. In this specification a combined heat exchanger means a heat exchanger with a single body having a primary fluid and two or more independent internal flow circuits having by two or more secondary fluids wherein the combined heat exchanger is configured and arranged to exchange heat between the primary fluid and each of the secondary fluids.

In an exemplary embodiment shown in FIG. 2 the first condensate preheater 46 is a condensate preheater that is arranged at least partially in parallel to the low pressure condensate system 40 while in a not shown exemplary embodiment, the first condensate preheater 46 is a condensate preheater that is arranged in series with or else is integrated into the low pressure condensate system 40.

Figure 3:
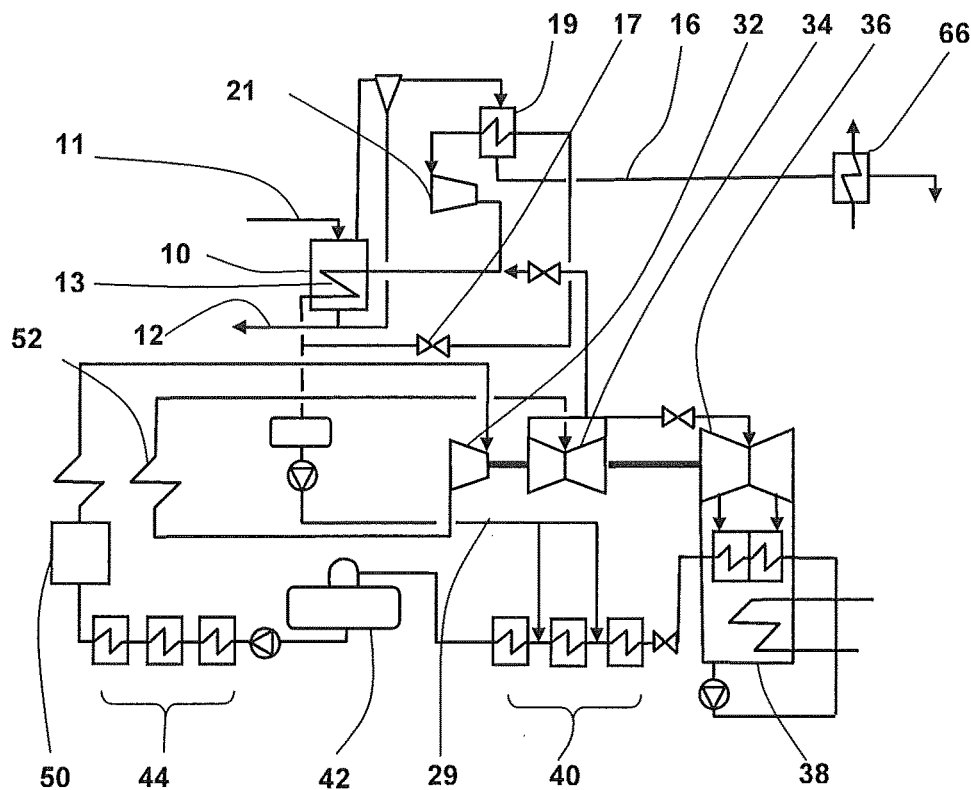
FIG. 3 is a schematic of an exemplary embodiment showing the heat pump circuit of FIG. 1 and an alternate direct thermal integration into the combustion air.

In an exemplary embodiment shown in FIG. 3, a combustion air heat exchanger 66 is thermally connected to the vapour outlet line 16, either upstream (not shown), downstream or in parallel (not shown) with the evaporator heat exchanger 19. The combustion air heat exchanger is configured and arranged to preheat a combustion air for use in the lignite fired boiler 50 of lignite fired steam power plant.

Figure 4:
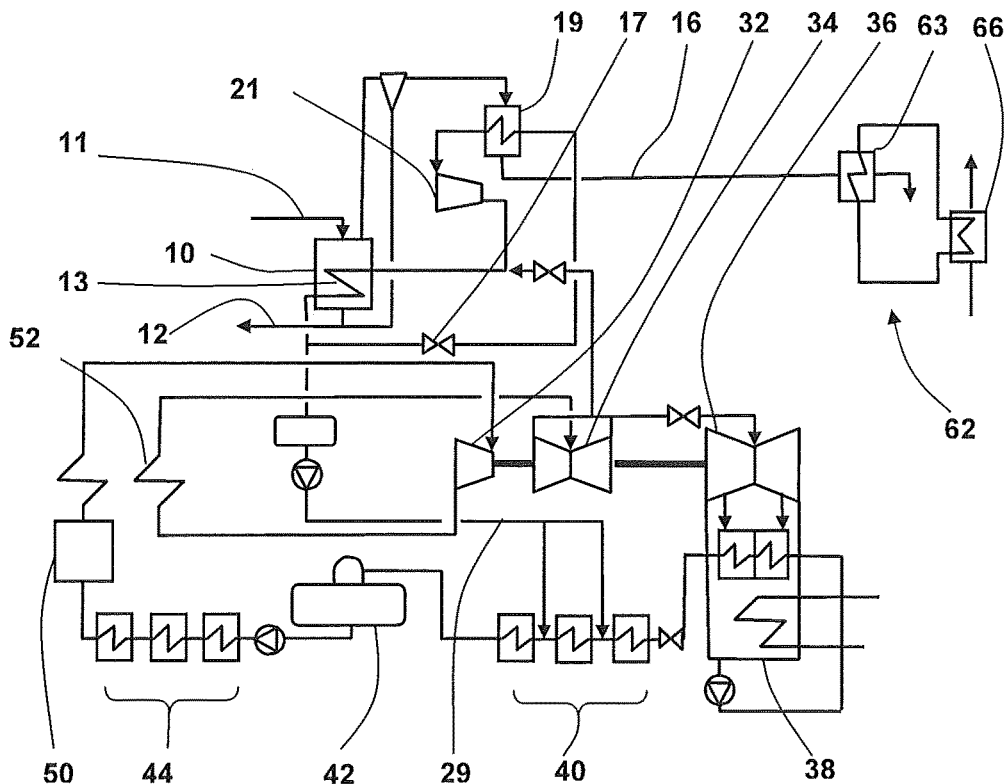
FIG. 4 is a schematic of an exemplary embodiment showing the heat pump circuit of FIG. 1 and an alternate indirect thermal integration into the combustion air.

In an exemplary embodiment shown in FIG. 4 the lignite fired steam power plant utilises thermal energy in the vapour outlet line 16 to preheat combustion air by including an intermediate water loop 62 that is heated by the vapour outlet line 16 and in turn heats combustion air. The intermediate water loop 62 includes a working fluid, such as water, an intermediate heat exchanger 63 fluidly connected to the vapour outlet line 16 either upstream (not shown) or downstream or in parallel (not shown) of the evaporator heat exchanger 19 or else combined with the evaporator heat exchanger 19 (not shown), and the combustion air heat exchanger 66. The intermediate water loop 62 is further adapted to receive thermal energy from vapour of the dryer 10 in the intermediate heat exchanger 63 from the vapour outlet line 16 and transfer the received thermal energy to the working fluid where it is transfer to the combustion air by means of the combustion air heat exchanger 66.

In a plant configuration that includes a heat pump circuit connected to the water/steam power cycle with additional heat recovery as provided in exemplary embodiments, it has been shown equivalent or better performance and a reduced capital cost compared to a plant configuration with a WTA type 1 system or heat pump system without connection to the water/steam power cycle; and at least 1.2% additional net output, for example an additional 7.3 MW for a 600 MW plant, or a 0.6% point net efficiency increase compared to a plant configuration with a WTA type 2 system. In addition, the exemplary embodiments introduce flexibility in the process, allowing either pure extraction mode or pure heat loop mode at partial load, or optionally pure extraction mode at high load for adequately sized extraction.

Exemplary embodiments were also found suitable for use with lignite fired steam power plants that include carbon dioxide capture.

Although the disclosure has been herein shown and described in what is conceived to be the most practical exemplary embodiment, the present disclosure can be embodied in other specific forms. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

The invention claimed is:

1. A lignite fired steam power plant comprising:
   a water/steam power cycle having:
      a pressure series of steam turbines;
      a condenser, at a low pressure end of pressure series of steam turbines, configured and arrange to condense a steam exhausted from the low pressure end of the pressure series of steam turbines; and
      a low pressure condensate system, arrangement downstream of the condenser, adapted to preheat a condensate from the condenser;
   a dryer system for drying lignite coal, the dryer system having:
      a dryer;
      a first outlet line for removing a vapour from the dryer; and
      a heat pump circuit, configured and arranged to provide heat energy to the dryer, comprising:
         a first working fluid;
         a dryer heat exchanger in the dryer;
         an expansion device fluidly connected and downstream of the dryer heat exchanger;
         an evaporator heat exchanger fluidly connected to and downstream of the expansion device and further connected to the first outlet line so as to enable heat energy transfer from the vapour of the first outlet line to the first working fluid;
         a compressor, fluidly connected to and downstream of the evaporator heat exchanger and upstream of the dryer heat exchanger, for compressing the first working fluid;
         a steam makeup line, extending from the pressure series of steam turbine to a first point fluidly between the dryer heat exchanger and the compressor; and
         a condensate return line extending from a second point fluidly between the dryer heat exchanger and the expansion device to the low pressure condensate system so as to return a condensate from the heat pump circuit into the water steam power cycle.

2. The lignite fired steam power plant of claim 1 wherein the dryer is a fluidised bed dryer.

3. The lignite fired steam power plant of claim 1 wherein the dryer is a steam heated rotary tube dryer.

4. The lignite fired steam power plant of claim 1 wherein the expansion device is a valve.

5. The lignite fired steam power plant of claim 1 wherein the expansion device is a turbine.

6. The lignite fired steam power plant of claim 1, further comprising a first condensate preheater, in parallel or in series with at least a portion of the low pressure condensate system, wherein the first outlet line, downstream of the evaporator heat exchanger, extends through the first condensate preheater so as to enable transfer of heat energy from the vapour of the dryer to a condensate of the water steam cycle.

7. The lignite fired steam power plant of claim 1, further comprising a first condensate preheater, in parallel or in series with at least a portion of the low pressure condensate system, wherein the first outlet line, upstream of the evaporator heat exchanger, extends through the first condensate preheater so as to enable transfer of heat energy from the vapour of the dryer to a condensate of the water steam cycle.

8. The lignite fired steam power plant of claim 6, wherein the first condensate preheater and the evaporator heat exchanger are combined as a single unit.

9. The lignite fired steam power plant of claim 1, further comprising a first condensate preheater, in parallel or in series with at least a portion of the low pressure condensate system, wherein a branch in the first outlet line, upstream of the evaporator heat exchanger extends through the first condensate preheater so as to enable transfer of heat energy from the vapour of the dryer to a condensate of the water steam cycle.

10. The lignite fired steam power plant of claim 1, further comprising a combustion air heat exchanger, thermally connected to the first outlet line for heating a combustion air for use in the lignite fired steam power plant.

11. The lignite fired steam power plant of claim 10 further comprising an intermediate water loop comprising:
a second working fluid;
an intermediate heat exchanger thermally connected to the first outlet line; and
the combustion air heat exchanger,
wherein the intermediate water loop is adapted to receive a thermal energy from the vapour of the first outlet line in the intermediate heat exchanger and transfer the received thermal energy to the second working fluid where it is transfer to the combustion air by means of the combustion air heat exchanger.

12. The lignite fired steam power plant of claim 10 wherein the combustion air heat exchanger is fluidly connected to the first outlet line in parallel of the evaporator heat exchanger.

13. The lignite fired steam power plant of claim 11 wherein the intermediate heat exchanger is fluidly connected to the first outlet line in parallel of the evaporator heat exchanger.

14. The lignite fired steam power plant of claim 11 wherein the intermediate heat exchanger is combined with the evaporator heat exchanger and fluidly connected to the first outlet line.

* * * * *